United States Patent
Collison

(10) Patent No.: US 7,051,118 B2
(45) Date of Patent: May 23, 2006

(54) METHOD AND APPARATUS FOR ANONYMOUS SUBJECT-BASED ADDRESSING

(75) Inventor: Derek L. Collison, Foster City, CA (US)

(73) Assignee: TIBO Software, Inc., Palo Alto, CA (US)

( * ) Notice: Subject to any disclaimer, the term of this patent is extended or adjusted under 35 U.S.C. 154(b) by 838 days.

(21) Appl. No.: 09/746,757

(22) Filed: Dec. 21, 2000

(65) Prior Publication Data

US 2001/0032267 A1 Oct. 18, 2001

Related U.S. Application Data

(60) Provisional application No. 60/171,930, filed on Dec. 22, 1999.

(51) Int. Cl.
G06F 15/16 (2006.01)

(52) U.S. Cl. .............. 709/246; 709/202; 709/203; 709/217; 709/218

(58) Field of Classification Search ........... 709/202, 709/203, 218, 226, 217, 246; 705/35, 37
See application file for complete search history.

(56) References Cited

U.S. PATENT DOCUMENTS

| | | | |
|---|---|---|---|
| 5,136,501 A * | 8/1992 | Silverman et al. .......... 705/37 |
| 5,557,798 A * | 9/1996 | Skeen et al. .............. 705/35 |
| 5,742,762 A | 4/1998 | Scholl et al. |
| 5,835,087 A | 11/1998 | Herz et al. |
| 5,966,531 A * | 10/1999 | Skeen et al. ............. 719/315 |
| 5,974,417 A * | 10/1999 | Bracho et al. ............ 707/10 |
| 5,974,441 A | 10/1999 | Rogers et al. |
| 5,987,454 A | 11/1999 | Hobbs |
| 6,038,601 A * | 3/2000 | Lambert et al. .......... 709/226 |
| 6,091,724 A * | 7/2000 | Chandra et al. .......... 370/390 |
| 6,216,132 B1* | 4/2001 | Chandra et al. ........ 707/103 R |
| 6,256,676 B1* | 7/2001 | Taylor et al. ............ 709/246 |
| 6,336,119 B1* | 1/2002 | Banavar et al. ......... 707/104.1 |
| 6,351,761 B1* | 2/2002 | Cantone et al. .......... 709/202 |
| 6,567,893 B1* | 5/2003 | Challenger et al. ....... 711/118 |
| 2003/0005084 A1* | 1/2003 | Humphrey .............. 709/218 |

* cited by examiner

Primary Examiner—Nabil El-Hady
(74) Attorney, Agent, or Firm—Baker & McKenzie LLP

(57) ABSTRACT

A method for anonymous subject-based addressing includes receiving, from a client computer, a point-to-point request message. The method also includes converting the point-to-point request message to a subject-based message. The subject-based message is also multicast. Additionally, a response is received to the subject-based message. The method also includes converting the response to the subject-based message to a point-to-point response message. Moreover, the point-to-point response message is transmitted back to the client computer.

35 Claims, 5 Drawing Sheets

METHOD AND APPARATUS FOR ANONYMOUS SUBJECT-BASED ADDRESSING

This is a continuation of U.S. Provisional Patent Application No. 60/171,930, entitled "Web Server and Web Server Method for Anonymous Subject-Based Addressing", filed Dec. 22, 1999.

FIELD OF THE INVENTION

The invention relates to network communications. More specifically, this invention relates to a client computer accessing content from a remote server.

BACKGROUND OF THE INVENTION

The World Wide Web and its ever-growing population and acceptance have developed a standard way of addressing information. Typically, the web browser sends a file request to a host server that, in turn, "serves up" the file to the user.

This is achieved using the Internet's underlying architecture, which is built on a foundation of HyperText Transfer Protocol (HTTP) or HyperText Transfer Protocol Secure (HTTPS), Transmission Control Protocol (TCP) and Internet Protocol (IP). In accordance with this set of protocols, a server program on a web server "listens" for a client program (a client web browser) executing on a client computer to connect. The client browser connects to the server by utilizing a Uniform Resource Language (URL). A URL consists of a protocol specification (e.g. HTTP, FTP), a host destination, and a file specification. The host destination is effectively an address for point-to-point communications.

This typical Internet communication is illustrated in FIG. 1. In particular, FIG. 1 illustrates a system diagram of a browser, web server and application server of the prior art. FIG. 1 includes web browser 11, Internet 13, server 15, servers 15.1–15.5, database 17 and content server 19. As shown server 15 includes files 16.1–16.n and executable 18. Moreover, servers 15.1–15.5 can also include files 16.1–16.n and executable 18 (not shown), which is described in more detail below. Web browser 11 is coupled to servers 15 and 15.1–15.5 through Internet 13. In operation, web browser 11 submits a call through Internet 13 to one of servers 15 and 15.1–15.5. An example of such a call could be "http://www.rv.tibco.com/whitepaper.html". This call includes the protocol specification (http), a host address (www.rv.tibco-.com), which is the address of server 15 and a file specification (whitepaper.html).

Typically, server 15 processes this call as a file-based lookup. The requested file is then returned by server 15 through Internet 13 to web browser 11 as an HTTP compliant file, as, for example, a web page. Server 15 can return the file directly to web browser 11 or process the requested file and return the results of the processing. The processing of the file could, for example, result in a call to database 17 and/or an accessing of the file from content server 19.

Thus, the client, web browser 11, sets up a two-way or point-to-point communication with server 15. The communication is established by web browser 11 sending an HTTP request to server 15. In the example of the call for "http//www.rv.tibco.com/whitepaper.html", server 15 (at "www.rv.tibco.com") interprets this request as a GET and determines that the client (web browser 11) wants a file named "whitepaper.html". Effectively, therefore, the call "http://www.rv.tibco.com/whitepaper.html" is a file pointer where "whitepaper.html" is a file stored on the server www.rv.tibco.com that is to be retrieved using the HTTP protocol. Moreover, in the absence of the suffix "whitepaper.html", the call "http://www.rv.tibco.com" is a file pointer that is interpreted as a GET call of a default page, Typically "index.html" on the server "www.rv.tibco.com". As illustrated by FIG. 1, current Internet (HTTP/HTTPS/TCP/IP) architecture centers on a filed-based web server that is reliant on a point-to-point communication between the client and the server.

File-based architectures combined with ever growing needs for expansion of 7-days-a-week-by-24-hours-a-day (7×24) services in light of higher security impose significant limitations on scalability and otherwise updating and modifying of the different servers. In particular, a file-based web server has to be updated internally to handle extensions to this system. This means shutting down the server for updates, upgrades, and scaling, thereby losing 7×24 availability. Thus the file-based server has become difficult to maintain, extend, and scale, especially as demands for expanded customer services and dynamic real-time content have increased.

This problem is further exacerbated in multi-server environments, also illustrated in FIG. 1. In multi-server environments as illustrated in FIG. 1 having five servers 15.1–15.5, it is necessary to replicate the contents of server 15 onto each of servers 15.1–15.5. Accordingly, this means that copies of all the files 16.1–16.n and executable 18 must be replicated five times for each of servers 15.1–15.5. Similarly, as illustrated, the point-to-point links from servers 15 and 15.1–15.5 to database 17 and content server 19 must be made for each of such servers.

As indicated before, updating and scaling requires internal updates to the web servers, which means that all the computers (servers) must be shut down, negatively impacting 7×24 availability. This also means that it is difficult for businesses to expand and adapt their systems to meet the needs of their customers. Accordingly, there is a need for an alternative system.

SUMMARY OF THE INVENTION

One embodiment of the present invention provides a method that includes receiving, from a client computer, a point-to-point request message. The method also includes converting the point-to-point request message to a subject-based message. The subject-based message is also multicast. Additionally, a response is received to the subject-based message. The method also includes converting the response to the subject-based message to a point-to-point response message. Moreover, the point-to-point response message is transmitted back to the client computer.

BRIEF DESCRIPTION OF THE DRAWINGS

Embodiments of the invention may be best understood by referring to the following description and accompanying drawings which illustrate such embodiments. In the drawings.

DETAILED DESCRIPTION

A method and an apparatus for anonymous subject-based addressing in network communications are described. Accordingly, different terminology related to subject-based addressing in a network is disclosed herein. The term "publish" is synonymous with the term "send", while the term "subscribe" is synonymous with the term "listen." Moreover, in the following description, for purposes of explanation, numerous specific details are set forth in order to provide a thorough understanding of the present invention. It will be evident, however, to one skilled in the art that the present invention may be practiced without these specific details.

Figure 1:
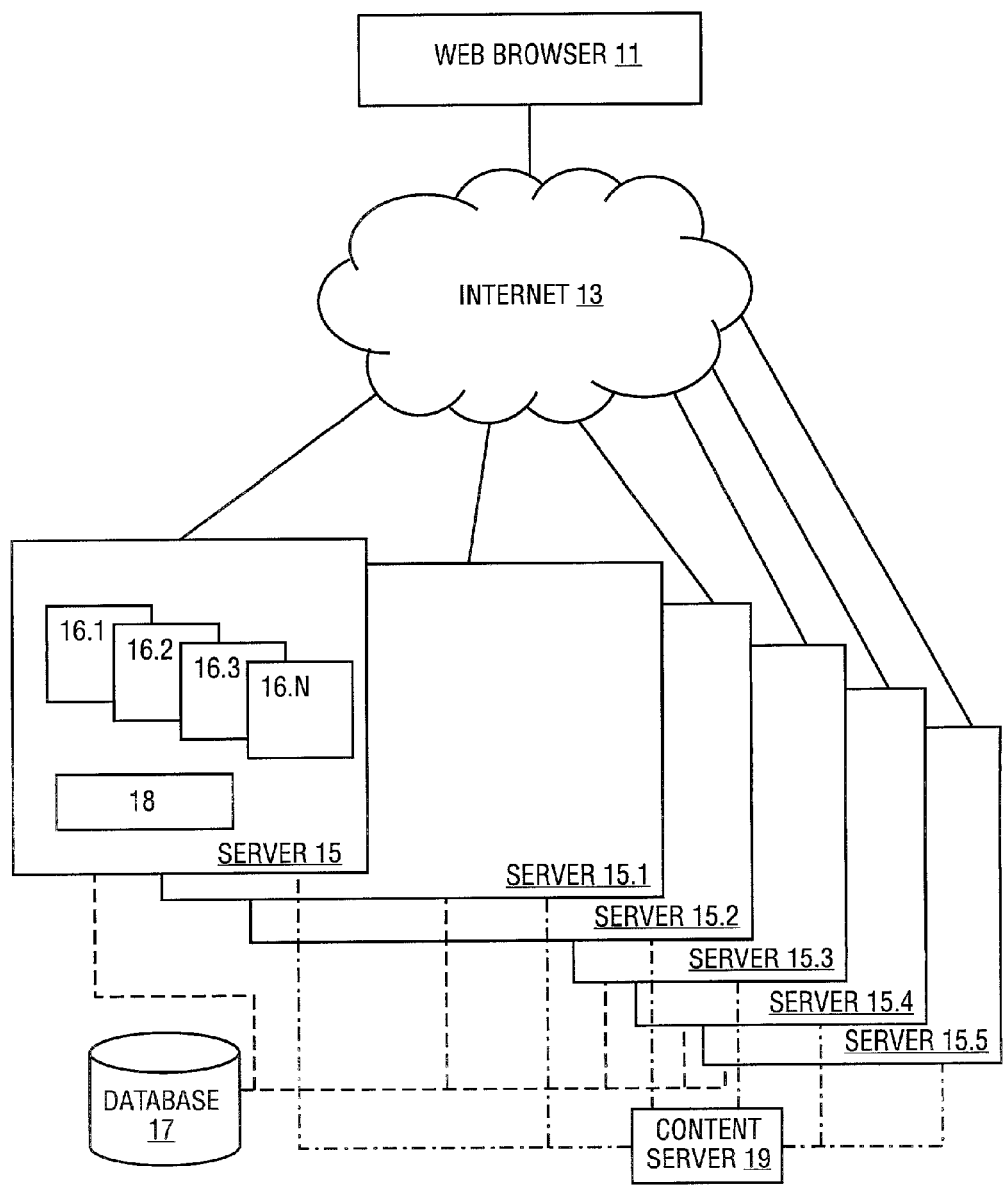
FIG. 1 illustrates a system diagram of a browser, web server and application server of the prior art.
Figure 2:
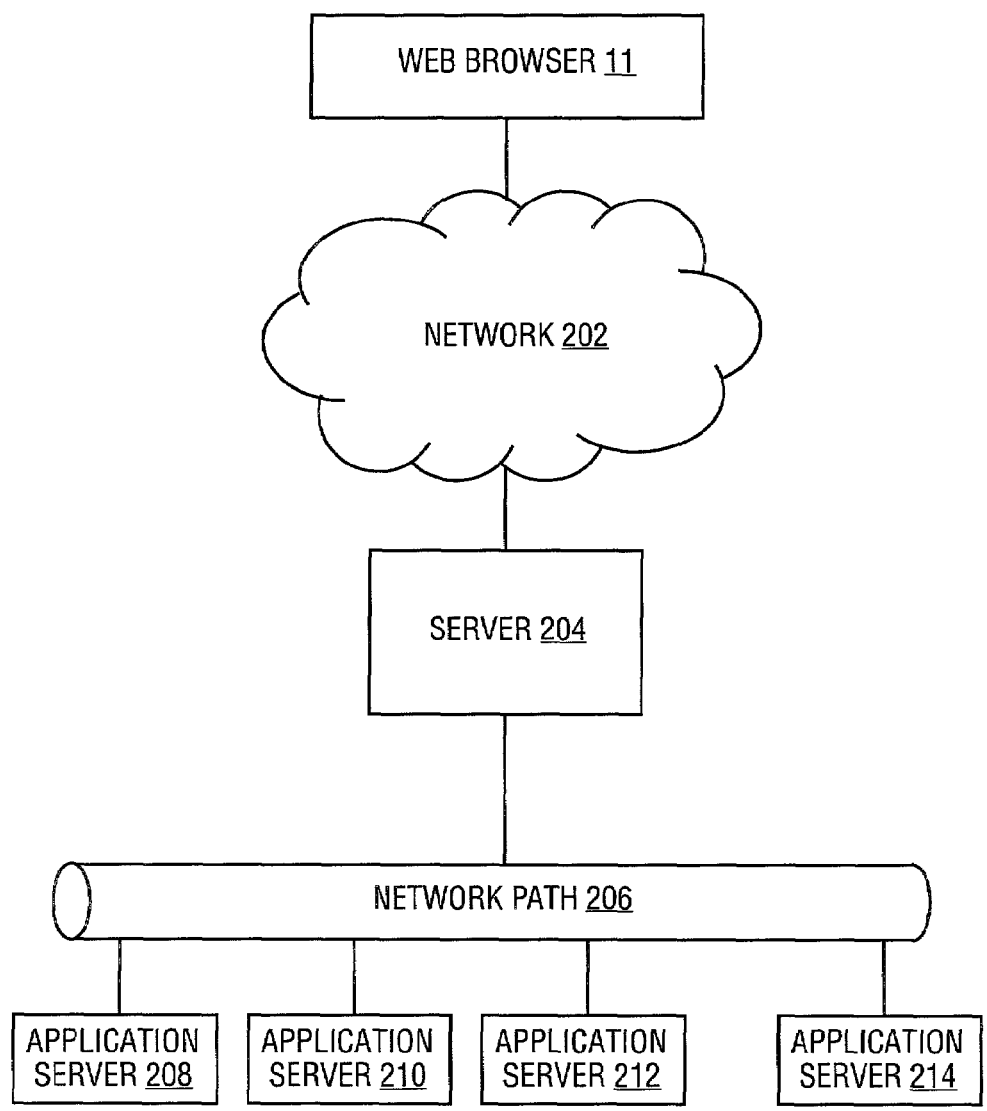
FIG. 2 illustrates a system diagram of a web browser, web server and application servers, according to embodiments of the present invention.

FIG. 2 illustrates a system diagram of a web browser, web server and application servers, according to embodiments of the present invention. In particular, FIG. 2 includes web browser 11, network 202, server 204, network path 206 and application servers 208–214. Web browser 11 is coupled to server 204 through network 202. Further server 204 is coupled to application servers 208–214 through network path 206.

In one embodiment, network 202 is a local area network (LAN). In another embodiment, network 202 is a wide area network (WAN). In one such embodiment, network 202 is the Internet. Further, network 202 can be a combination of different networks that provide communication among web browser 11 and servers 204–214. Additionally, the topology of FIG. 2 is by way of example and not by way of limitation, as other types of topologies can be incorporated into embodiments of the present invention. For example, the coupling among servers 204–214 can be through network 202 instead of through network path 206 that is separate from network 202.

Figure 3:
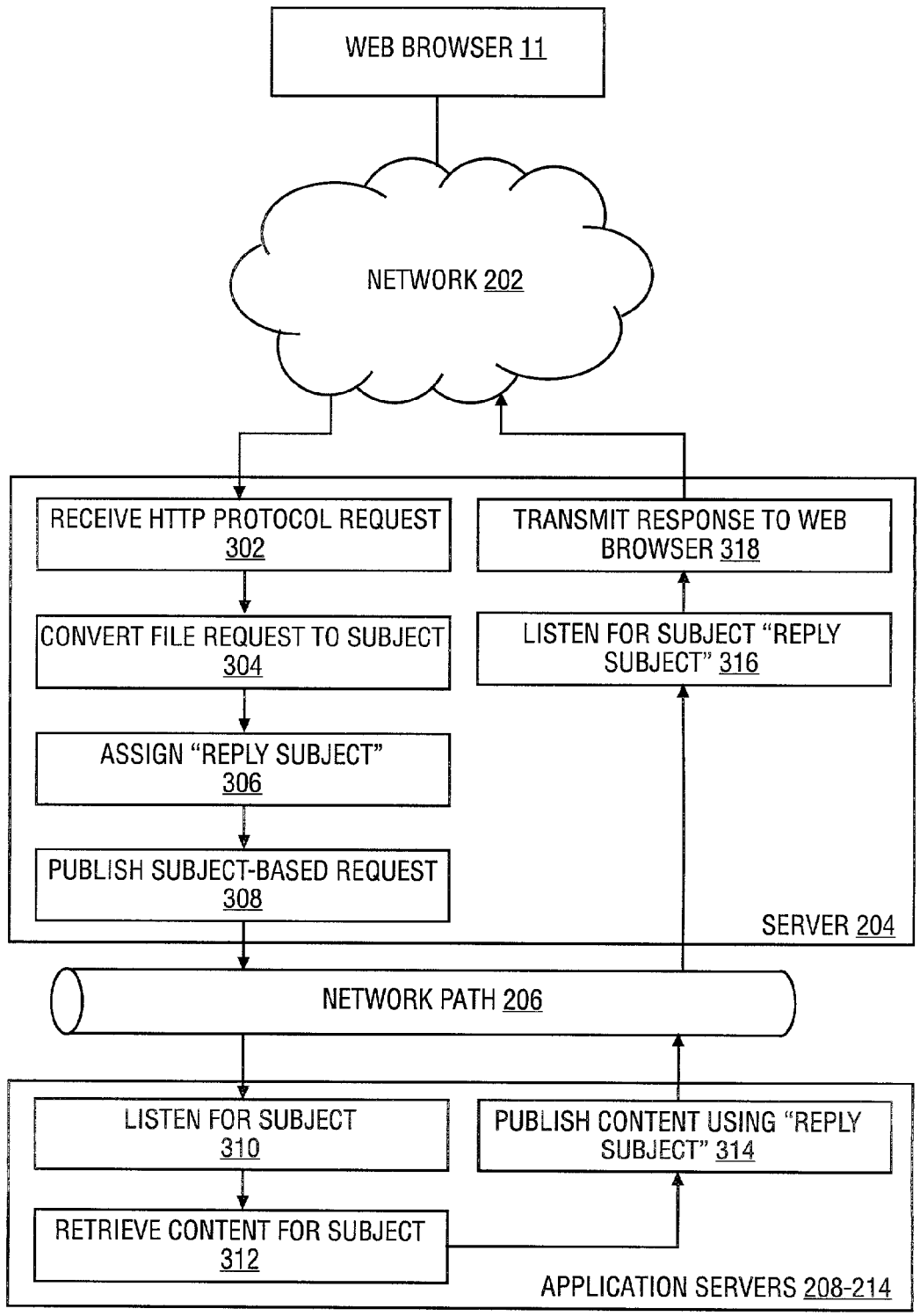
FIG. 3 illustrates a system diagram of a browser, web server, application servers and the functionality therein, according to embodiments of the present invention.

FIG. 3 illustrates a system diagram of a browser, web server, application servers and the functionality therein, according to embodiments of the present invention. In particular, FIG. 3 illustrates a method of operation for server 204 and application servers 208–214, according to embodiments of the present invention. For the sake of simplicity, one block within FIG. 3 is illustrating the functionality of each of application servers 208–214. In operation, web browser 11 transmits an HTTP protocol request for data to server 204 through network 202. Server 204 receives the HTTP request, at process block 302.

Server 204 converts this HTTP request into a subject-based request for a publish/subscribe communication, at process block 304. Publish/subscribe communications technology expedites the delivery of real-time information in, for example, the financial industry. In particular, publish/subscribe communications enables applications in any environment to share up-to-date information reliably and transparently. In such communications, a given publish/subscribe message traverses a network, thereby allowing devices, such as servers, that are connected to this network to subscribe to different publish/subscribe messages. For example, a given publish/subscribe message may be regarding the request for a particular file that is residing on different servers on the network. This message would be formatted such that when the message is received the subscribers know which file needs to be transmitted back to the requesting device that originally transmitted the publish/subscribe message. In contrast, point-to-point communications would send the same message individually to each subscriber, thereby wasting network bandwidth and slowing delivery of such messages.

Additionally, server 204 assigns a reply subject, at process block 306 and publishes the subject-based message, at process block 308. In an embodiment, a subject name is a character string that describes the content of a message and specifies the destination of a message. Subject-based addressing technology helps messages reach their destinations without involving application designers in the details of network addresses, protocols, packets, ports and sockets. In one embodiment, such application designers devise conventions for intuitive, human-readable subject names.

Moreover, traditional network programming incorporates IP addresses into messaging distribution, thereby binding programs to specific computing devices. In contrast, subject-based addressing applications share information by subject names, thereby freeing applications to run on any computing device at any location on a network. In particular, interested parties, such as a server on the network, listen for (subscribe to) specific subject names. Accordingly, when a first device (a publisher) publishes a message on a specific subject name and other devices on the network (subscribers) are listening for (subscribing to) that subject name, this subject-based addressing scheme reliably routes the messages from the publisher to the subscribers. Any application executing on a device on the network can, therefore, send messages to any other applications executing on devices on the network. This subject-based addressing scheme makes distributed systems much more flexible and maintainable.

Applications, therefore, receive messages by listening. Additionally, in an embodiment, listening by a given device associates a subject name with a callback function which can be executed on such a device. In particular, when a message arrives, subject-based addressing software dispatches this message to the appropriate callback function by matching a given subject name to a particular callback function.

As described, subject-based addressing technology allows for location transparency. Publishers and subscribers within this technology can run on any computer on a network. Further, server applications can migrate and replicate (to share a heavy client load) with no impact on existing clients. For example, because the publisher (or the client) is not required to know the specific address (e.g., IP address) for its subscribers, subscribers can be added, removed or modified without impacting how the publisher transmits its subject-based messages. Accordingly, this subject-based addressing technology allows end users to build scalable workflow systems that can adapt easily to change and growth.

One example of building a scalable workflow system can occur during times of heavy load, as the system may need to respond by adding resources to accommodate this load. Old systems would need to plan this upgrade to the system in advance. Even then one can be caught off guard at the sheer size of the Internet population, and the number of simultaneous requests that need to be processed by the web server. When this occurs, current architectures cannot scale, they are statically created systems with bounded resources, as quick adaptation is not an available option. With embodiments of the present invention, additional resources can be added dynamically on the fly, and in real-time, to decrease latencies and avoid denial of service to customers. These backend systems can also take themselves off-line when the load subsides.

Returning to FIG. 3, in an embodiment, this subject-based request message is multicast over network 206. In one such embodiment, application servers 208, 210, 212 and 214 are listening for the requests for the given subject matter, at process block 310. Upon receipt of the subject-based request, application servers 208, 210, 212 and 214 process such a request by retrieving the content for the given subject matter, at process block 312. In one embodiment, the content is retrieved from a local database stored within application servers 208, 210, 212 and 214. However, embodiments of the present invention are not so limited, as such content can be retrieved from other locations. For example, the content can be stored on another remote server. Moreover, at process block 314, application servers 208, 210, 212 and 214 publish this retrieved content using a message having a reply subject which was assigned by server 204 at process block 306.

In an embodiment, at process block 316, server 204 begins listening for a response to the subject-based message once the subject-based request is published at process block 308. Upon receipt of the response to the subject-based message from any of application servers 208, 210, 212 or 214, server 204 generates a point-to-point response based on the fields and content within the response. In an embodiment, this point-to-point response is based on the HTTP protocol. This generation of the point-to-point response is described in more detail below in conjunction with FIG. 4. Server 204 transmits this point-to-point response back to web browser 11 through network 202, at process block 318. In an embodiment, upon receipt of such a response, web browser 11 generates a web page displaying the contents of this response to a user of web browser 11. However, embodiments of the present invention are not so limited, as web browser 11 could perform other actions upon receipt of such a response. For example, this response could be a redirect to another web page, thereby causing web browser 11 to generate a new HTTP protocol request to server 204.

Accordingly, web browser 11 sends an HTTP/HTTPS compliant protocol through network 202 using a TCP/IP/HTTP/HTTPS set of protocols. Server 204 receives this call, packet or message from web browser 11 and converts it into a subject-based call. For example, an originated call, "http://www.rv.tibco.com/whitepaper.html", from web browser 11 is converted into a subject-based message, "whitepaper.html". Note, server 204 receiving this browser call would be a server identified by address "www.rv.tibco.com". After assigning of a reply subject, such as "A762 whitepaper.html", server 204 multicasts the subject-based request over network 206, such that all of the servers that are listening for this particular subject-based message (e.g., application servers 208–214) can receive the message. In an embodiment, application servers 208–214 can be on a local or wide area network of multiple computers. In one embodiment, application servers 208–214 are scalable. Moreover, in an embodiment, servers 204 and 208–214 can be located on a same server.

Figure 4:
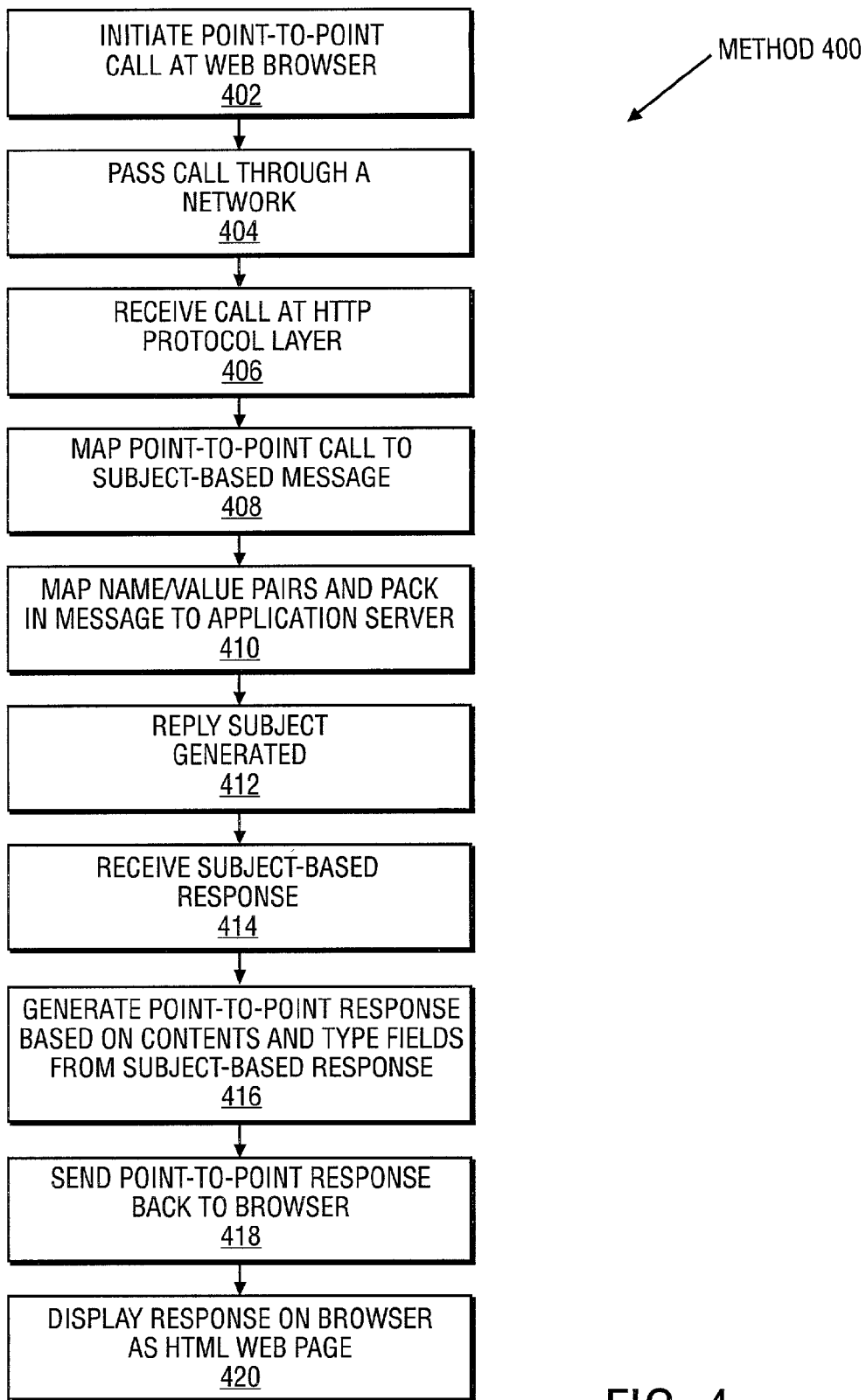
FIG. 4 is a flowchart illustrating a method for processing requests that incorporates subject-based messages, according to embodiments of the present invention.

FIG. 4 is a flowchart illustrating a method for processing requests that incorporates subject-based messages, according to embodiments of the present invention. In particular, FIG. 4 illustrates method 400 that commences with a call that is initiated at web browser 11, at process block 402. Web browser 11 initiates the call by sending an HTTP/HTTPS compliant call through network 202, using the TCP/IP/HTTP/HTTPS set of protocols, at process block 404. Accordingly, server 204 receives the call, at process block 406. Server 204 maps the point-to-point call or request to a subject-based message, at process block 408. For example, if the call or request coming from web browser 11 is a file request, such as "http:// . . . /whitepaper.html", this call or request is mapped into the subject space of "whitepaper.html".

Moreover, the HTTP request is mapped to name/value pairs and packed into a subject-based message, at process block 410. Additionally, server 204 generates a reply subject, at process block 412. In one embodiment, this generation of a reply subject includes the generation of a listen event for all subsequent messages published on that particular subject by server 204. Such messages represent the response whose content is to be sent to web browser 11. Moreover, the generation of a reply subject includes the publishing of the subject-based request.

When one of application servers 208-214 returns a response to the subject-based request, server 204 receives this response based on the previously assigned reply subject, at process block 414. Further, server 204 generates a point-to-point response based on the contents and the type fields of this subject-based response, at process block 416. In an embodiment, the point-to-point response is an HTTP or HTTPS response. Server 204 then sends this point-to-point response back to web browser 11, at process block 418. In one embodiment, web browser 11 displays the response as an HTML web page, at process block 420. However, as described above, the response coming back from server 204 is not limited to a web page for display, as embodiments of the present invent ion can incorporate any other type of response communication between a server and a client computer.

Figure 5:
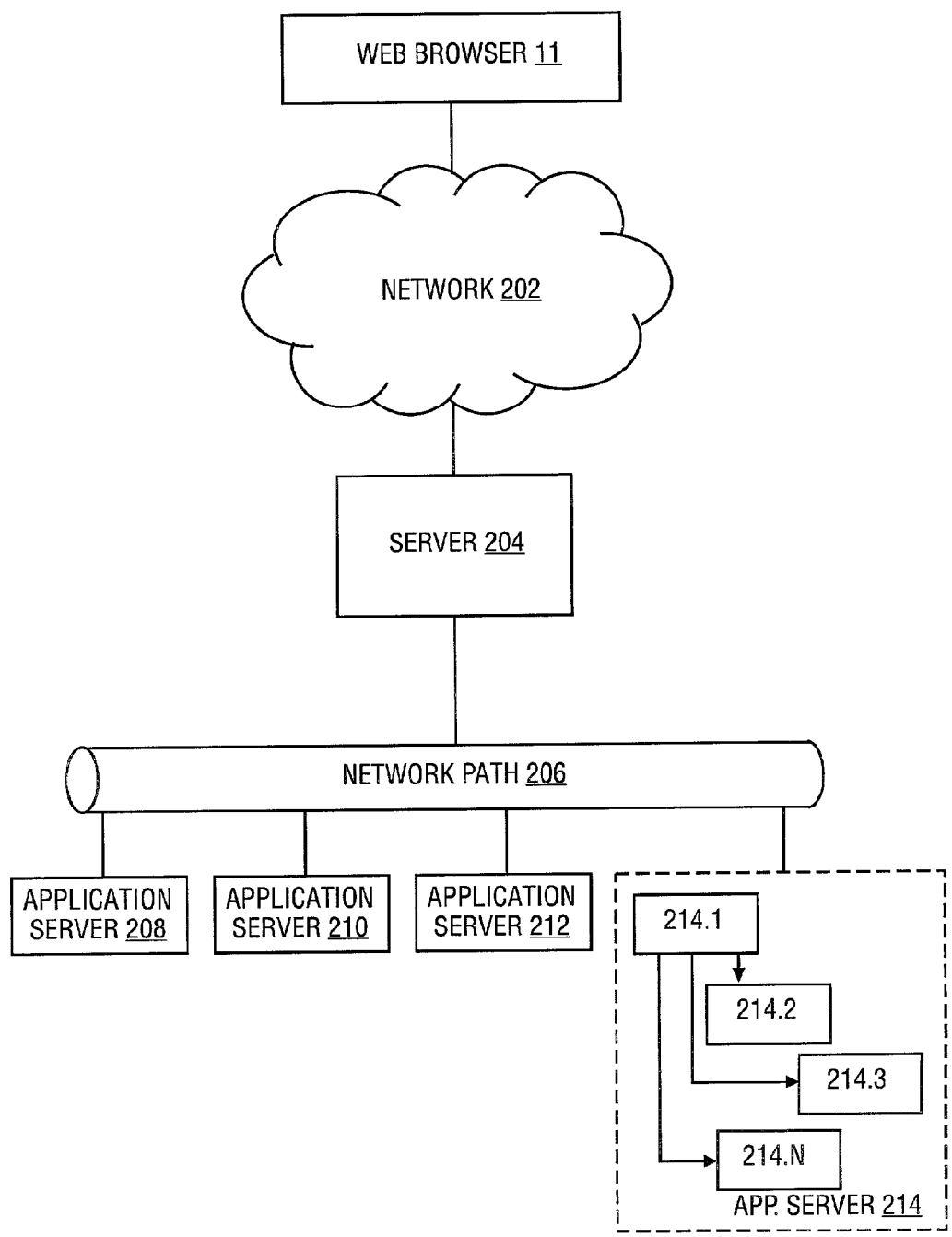
FIG. 5 illustrates a block diagram of a system application of embodiments of the present invention.

FIG. 5 illustrates a block diagram of a system application of embodiments of the present invention. Similar to FIG. 2, FIG. 5 includes web browser 11, network 202, server 204, network path 206 and application servers 208–214. Web browser 11 is coupled to server 204 through network 202. Further server 204 is coupled to application servers 208–214 through network path 206.

Additionally, as shown, application server 214 can include a number of servers therein (application servers 214.1–214.n). In one embodiment, application servers 214.1–214.n are connected through a local area network (LAN). In another embodiment, application servers 214.1–214.n are connected through a wide area network (WAN). In one such embodiment, application servers 214.1–214.n are connected through the Internet. Further, application servers 214.1–214.n are connected through a combination of different networks that provide communication these application servers.

Subject-based addressing, in contrast to point-to-point-based addressing, allows queuing and load balancing of request messages, which is illustrated by FIG. 5. Embodiments of the present invention also provide for the incorporation of distributed queues therein, which will be illustrated by the configuration and operations of application servers 214.

In operation, application servers 214.1–214.n are associated with a distributed queue such that received subject-based messages, as described above in conjunction with FIGS. 3–4 are placed in this queue. Moreover, one of application servers 214.1–214.n is designated as the active scheduler for this distributed queue. In an embodiment, the active scheduler is determined based on scheduler weight. Scheduler weight represents the ability of a member session to fulfill the role of scheduler, relative to other members of the same queue. In one such embodiment, the scheduler weight is based on the availability of resources therein.

Moreover, in an embodiment, application server 214.1–214.n having the highest scheduler weight is designated as the scheduler.

Additionally, in one embodiment, the given server (e.g., application server 214.1), which is the active scheduler, sends heartbeat messages at specified intervals to the other server members of the distributed queue (e.g., application servers 214.2–214.n). These heartbeat messages inform other member servers that the active scheduler is still alive. Accordingly, each of the servers of the distributed queue should specify the same scheduler activation interval for receiving these heartbeat messages. When the heartbeat messaging from the active scheduler has been silent for this activation interval, the queue member of the remaining queue members having the greatest scheduler weight takes the active scheduler's place as the new active scheduler.

Accordingly, this type of scheduling provides the necessary fault tolerance such that a given member server 214.1–214.n acts as the scheduler for the distributed queue. Any member server 214.1–214.n has the potential to become the scheduler, as these fault tolerant parameters (e.g., scheduling weight) select the most suited member server as the active scheduler for the distributed queue.

Moreover, all the application servers, including the active scheduler, that are part of the distributed queue are defined to be workers or listeners, as these application servers listen for the subject-based messages coming into the distributed queue and are assigned the tasks of working on or processing these subject-based messages. In an embodiment, application servers 214.1–214.n of the distributed queue could share the same reusable correspondent name indicating that they are members of the queue with that name. In one such embodiment, each member of the distributed queue listens for the same subject. However, even when each member listens, for each inbound message, only one member processes the message.

In particular, when a subject-based message is received into the distributed queue for application servers 214.1–214.n, the active scheduler (e.g., application server 214.1) assigns the task of processing this subject-based message to any of application servers that are associated with the distributed queue, including the active scheduler. In one embodiment, the active scheduler assigns the processing task for a given subject-based message based on worker or listener weights.

In one such embodiment, the active scheduler assigns the processing task to the available worker or listener with the greatest worker or listener weight. In an embodiment, a worker or listener is considered available unless (1) the pending tasks assigned to this worker or listener exceeds its task capacity or (2) the worker or listener is the active scheduler. However, the active scheduler does assign tasks to itself when the other workers or listeners are not available.

Task capacity is defined as the maximum number of tasks that a worker or listener can accept. In an embodiment, when the number of accepted tasks reaches this maximum, the worker or listener cannot accept additional tasks until the completion of at least one of the currently pending tasks. Upon receipt of a task based on an incoming subject-based message, the active scheduler assigns the tasks to the worker or listener with the greatest worker or listener weight—unless the pending tasks assigned to such a worker or listener exceeds its task capacity. In one embodiment, when this preferred worker or listener has exceeded its task capacity, the active scheduler assigns this new task to the worker or listener with the next greatest worker or listener weight.

In one embodiment, a default task capacity assigned to a server when the server is associated with the distributed queue is one. However, this value can be modified based on a number of different factors. In an embodiment, on a server that includes a number of processors that execute multi-threaded programs, such a server that devotes n threads and n processors to inbound tasks has a task capacity of n.

In one embodiment, communication time lag is factored into the task capacity for a given server. In most distributed queue applications, the communication time is an insignificant fraction of the task turnaround time. In other words, the time required to assign a task and signal its completion is very small in comparison to the time required to process the actual task. For example, when an average task turnaround time is 2000 milliseconds, wherein the communication time contributes 10 milliseconds to such a total, the task capacity is the same as the number of processors or threads.

However, in certain situations communication time can be significant. For example, communication time can become significant when the queue members are distributed at distant sites connected by a WAN or even the Internet or an Intranet. When communication time becomes significant, the meaning of task capacity changes. In particular, instead of signifying the number of tasks that a listener can process concurrently, the task capacity signifies the number of tasks that can fill the listener's capacity despite the communication time lag. For example, when the average task turnaround time is 1500 milliseconds, of which the average task processing time and communication time contribute 1000 milliseconds and 500 milliseconds, respectively, to the total, setting of the task capacity to account for the communication time minimizes the listener's idle time between tasks.

Accordingly, when tuning task capacity to compensate for communication time lag, balance is critical. "Underloading" a listener (by setting its task capacity too low) can cause the listener to remain idle while waiting for the active scheduler to assign its next task. Conversely, "overloading" a listener (by setting its task capacity too high) can cause some assigned tasks to wait, while other listeners that might have accepted those tasks to remain idle. In an embodiment, application servers 214.1–214.n support multiple qualities of services for delivery of subject-based messages.

As described, distributed queuing addresses the problem that it is undesirable for all n-application servers in making up a particular application server 214 to get every message published by server 204. Typically, all servers in the group 214 perform the same task. For example, it may be undesirable because each of the n-application servers in group 214 will take an action. In addition, if each application server is to receive the message (and possible respond to it) this will consume network bandwidth.

Nonetheless, it is imperative for at least one of the n-application servers in group 214 to receive the message, and that request message be load balanced between all possible application serves i.e., ideally the system should deliver the message to only one of the n-application servers 214. This type of situation arises where a large number n of application servers 214 is required to provide the desired level of fault tolerance and/or load balancing. Fault tolerance is important, for example, in situations where applications may be unstable or message delivery is absolutely critical.

In embodiments of the present invention, each application server in the group 214 sends messages to one of the n-application servers, say server 214.1, acting as the active scheduler, giving an indication of its weight. The active scheduler 214.1 then responds by sending the received subject based message to the particular application server in the group with the greatest weight. Accordingly, a distributed queue of subscribing servers in the group 214 can accept messages that represent tasks (updates and queries). The system assigns each task to exactly one of the servers, while the group of servers and the distribution of tasks remain completely transparent to the web server. The distributed queuing and task scheduling features are described in more detail in published PCT application WO 99/09490, which is hereby incorporated by reference.

Additionally, the computing devices, such as the servers, described herein, can include processing units and memory (not shown). Such memory includes a machine-readable medium on which is stored a set of instructions (i.e., software) embodying any one, or all, of the methodologies described above. Software can reside, completely or at least partially, within this memory and/or within such a processing unit. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and an apparatus for anonymous subject-based addressing in network communications have been described. Although the present invention has been described with reference to specific exemplary embodiments, it will be evident that various modifications and changes may be made to these embodiments without departing from the broader spirit and scope of the invention. For example, embodiments of the present invention are described that are employing TCP/IP/HTTP/HTTPS protocols between a given web browser and a given server. However, such embodiments are by way of example and not by way of limitation, as any other type of point-to-point protocol can be received by a given server and converted to a subject-based message.

Another example of a modification that can be made to these embodiments is the elimination of network path 206, as shown in FIGS. 2, 3 and 5. In particular, embodiments of the present invention are not limited to the transmission of a subject-based message to external servers coupled to network path 206, as a subject-based message may be transmitted to processes locally within server 204. Accordingly, the specification and drawings are to be regarded in an illustrative rather than a restrictive sense.

What is claimed is:

1. A method comprising:
   receiving, from a client computer, a point-to-point request message;
   converting the point-to-point request message to a subject-based message, the subject-based message addressed with a subject-based addressing protocol;
   multicasting the subject-based message;
   receiving a response to the subject-based message, the response to the subject-based message addressed with a subject-based addressing protocol;
   converting the response to the subject-based message to a point-to-point response message; and
   transmitting the point-to-point response message back to the client computer.

2. The method of claim 1, wherein the converting includes assigning a subject name and a reply subject to the subject-based message.

3. The method of claim 2, wherein the subject-based message is delivered to a group of subscribers that have subscribed to receive subject-based messages which have been assigned the subject name.

4. The method of claim 3, wherein the group of subscribers that have subscribed to receive the subject-based message can dynamically change.

5. The method of claim 1, wherein the point-to-point request message is based on HyperText Transfer Protocol.

6. The method of claim 1, wherein the subject-based message is independent of an identity of a recipient.

7. The method of claim 1, wherein the subject-based message is independent of a protocol used by a recipient of the subject-based message.

8. A method for processing a point-to-point request based on HyperText Transfer Protocol (HTTP), the method comprising:
   receiving, from a client computer, the point-to-point request;
   converting the point-to-point request to a subject-based message, the subject-based message addressed with a subject-based addressing protocol;
   multicasting the subject-based message to a number of application servers across a network;
   receiving a response to the subject-based message from one of the number of application servers, the response to the subject-based message addressed with a subject-based addressing protocol;
   extracting content from the response to the subject-based message;
   generating a point-to-point response using the content from the response to the subject-based message; and
   sending the point-to-point response back to the client computer.

9. The method of claim 8, wherein the converting includes assigning a subject name and a reply subject to the subject-based message.

10. The method of claim 8, wherein the subject-based message is independent of an identity of a recipient.

11. The method of claim 8, wherein the subject-based message is independent of a protocol used by a recipient of the subject-based message.

12. The method of claim 8, wherein the subject-based message is delivered to a group of subscribers that have subscribed to receive subject-based messages which have been assigned the subject name.

13. The method of claim 12, wherein the group of subscribers that have subscribed to receive the subject-based message can dynamically change.

14. A machine-readable medium that provides instructions, which when executed by a processor, cause said processor to perform operations comprising:
   receiving, from a client computer, a point-to-point request message;
   converting the point-to-point request message to a subject-based message, the subject-based message addressed with a subject-based addressing protocol;
   multicasting the subject-based message;
   receiving a response to the subject-based message, the response to the subject-based message addressed with a subject-based addressing protocol;
   converting the response to the subject-based message to a point-to-point response message; and
   transmitting the point-to-point response message back to the client computer.

15. The machine-readable medium of claim 14, wherein the converting includes assigning a subject name and a reply subject to the subject-based message.

16. The machine-readable medium of claim 14, wherein the point-to-point request message is based on HyperText Transfer Protocol.

17. The machine-readable medium of claim 14, wherein the subject-based message is independent of an identity of a recipient.

18. The machine-readable medium of claim 14, wherein the subject-based message is independent of a protocol used by a recipient of the subject-based message.

19. The machine-readable medium of claim 14, wherein the subject-based message is delivered to a group of subscribers that have subscribed to receive subject-based messages which have been assigned with the subject name.

20. The machine-readable medium of claim 19, wherein the group of subscribers to receive the subject-based message can dynamically change.

21. A machine-readable medium that provides instructions for processing a point-to-point request based on HyperText Transfer Protocol (HTTP), which when executed by a processor, cause said processor to perform operations comprising:
receiving, from a client computer, the point-to-point request;
converting the point-to-point request to a subject-based message, the subject-based message addressed with a subject-based addressing protocol;
multicasting the subject-based message to a number of application servers across a network;
receiving a response to the subject-based message from one of the number of application servers, the response to the subject-based message addressed with a subject-based addressing protocol;
extracting content from the response;
generating a point-to-point response using the content from the response; and
sending the point-to-point response back to the client computer.

22. The machine-readable medium of claim 21, wherein the converting includes assigning a subject name and a reply subject to the subject-based message.

23. The machine-readable medium of claim 21, wherein the subject-based message is independent of an identity of a recipient.

24. The machine-readable medium of claim 21, wherein the subject-based message is independent of a protocol used by a recipient of the subject-based message.

25. The machine-readable medium of claim 21, wherein the subject-based message is delivered to a group of subscribers that have subscribed to receive subject-based messages which have been assigned with the subject name.

26. The machine-readable medium of claim 25, wherein the group of subscribers to receive the subject-based message can dynamically change.

27. An application server coupled to a network, the application server comprising:
a database having data;
a processor coupled to the database, the processor to process subject-based messages received from a server, the subject-based messages addressed with a subject-based addressing protocol and including requests for data content wherein the subject-based messages are generated from point-to-point messages received from a client computer, the processing including:
listening for a subject-based request message being received from the network;
extracting portions of the data in the database based on the request in the subject-based message;
generating a subject-based response message that includes the portions of the data extracted from the database; and
transmitting the subject-based response message back to the server.

28. The application server of claim 27, wherein the point-to-point request message is based on HyperText Transfer Protocol.

29. The application server of claim 27, wherein the subject-based response message includes a subject name and a reply subject assigned by the server.

30. The application server of claim 27, wherein the subject-based message is independent of an identity of a recipient.

31. The application server of claim 27, wherein the subject-based message is independent of a protocol used by a recipient of the subject-based message.

32. A system comprising:
a server coupled to a network, the server to receive a point-to-point request message based on HyperText Transfer Protocol (HTTP) from a web browser and to process the point-to-point request message, the processing of the point-to-point request message including:
converting the point-to-point request message to a subject-based message, the subject-based message addressed with a subject-based addressing protocol;
multicasting the subject-based message;
receiving a response to the subject-based message, the response to the subject-based message addressed with a subject-based addressing protocols;
converting the response to the subject-based message to a point-to-point response message; and
transmitting the point-to-point response message back to the web browser; and
a number of application servers coupled to the network, each of the number of application servers comprising:
a database having data;
a processor coupled to the database, the processor to process the subject-based message received from the server, the processing of the subject-based message including:
listening for a subject-based request message being received from the network;
extracting portions of the data in the database based on the request in the subject-based message;
generating a subject-based response message that includes the portions of the data extracted from the database; and
transmitting the subject-based response message back to the server.

33. The system of claim 32, further comprising a distributed queue, the distributed queue to receive the subject-based message from the server, wherein one of the number of application servers schedules which of the application servers are to process the subject-based message received in the distributed queue.

34. The system of claim 32, wherein the number of application servers can dynamically change.

35. The system of claim 32, wherein the subject-based message is independent of a protocol used by the number of application servers.

* * * * *

UNITED STATES PATENT AND TRADEMARK OFFICE
CERTIFICATE OF CORRECTION

PATENT NO. : 7,051,118 B2
APPLICATION NO. : 09/746757
DATED : May 23, 2006
INVENTOR(S) : Derek L. Collison It is certified that error appears in the above-identified patent and that said Letters Patent is hereby corrected as shown below:

On Title Page, Item (73) should read,
(73) Assignee: TIBCO Software Inc., Palo Alto, CA Signed and Sealed this Twenty-seventh Day of March, 2007

JON W. DUDAS
*Director of the United States Patent and Trademark Office*